(12) United States Patent
Assenov

(10) Patent No.: US 12,288,046 B2
(45) Date of Patent: Apr. 29, 2025

(54) NO-CODE SOFTWARE DEVELOPMENT PLATFORM

(71) Applicant: Ivan Assenov, Wyoming, MI (US)

(72) Inventor: Ivan Assenov, Wyoming, MI (US)

( * ) Notice: Subject to any disclaimer, the term of this patent is extended or adjusted under 35 U.S.C. 154(b) by 9 days.

(21) Appl. No.: 17/960,197

(22) Filed: Oct. 5, 2022

(65) Prior Publication Data

US 2024/0069872 A1  Feb. 29, 2024

Related U.S. Application Data

(60) Provisional application No. 63/252,976, filed on Oct. 6, 2021.

(51) Int. Cl.
*G06F 8/34* (2018.01)

(52) U.S. Cl.
CPC ..................... *G06F 8/34* (2013.01)

(58) Field of Classification Search
None
See application file for complete search history.

(56) References Cited

U.S. PATENT DOCUMENTS

| | | | | |
|---|---|---|---|---|
| 10,620,948 | B2* | 4/2020 | Brebner | G06F 9/44526 |
| 2011/0161941 | A1* | 6/2011 | Thomson | G06F 8/34 |
| | | | | 715/765 |
| 2012/0022892 | A1* | 1/2012 | Feldman | G16H 10/60 |
| | | | | 600/300 |
| 2016/0085514 | A1* | 3/2016 | Savliwala | H04L 63/101 |
| | | | | 717/109 |
| 2016/0259902 | A1* | 9/2016 | Feldman | G16H 50/20 |
| 2018/0107343 | A1* | 4/2018 | Mills | G06F 8/35 |
| 2019/0132203 | A1* | 5/2019 | Wince | G06F 9/44505 |
| 2019/0220580 | A1* | 7/2019 | Brison | G06F 21/552 |
| 2019/0370420 | A1* | 12/2019 | Feng | G06F 30/20 |
| 2020/0234003 | A1* | 7/2020 | Bakman | H04M 1/72403 |
| 2021/0110328 | A1* | 4/2021 | Hsiao | G06Q 10/06316 |
| 2022/0121809 | A1* | 4/2022 | Bakman | H04M 1/72403 |
| 2022/0229637 | A1* | 7/2022 | Benassi | G06F 8/427 |

\* cited by examiner

*Primary Examiner* — Philip Wang
(74) *Attorney, Agent, or Firm* — Robert Cantrell; Jose W. Jimenez; JIMENEZ LAW FIRM

(57) ABSTRACT

Disclosed is a no-code software development platform having at least one user-facing administrative interface for application development and at least one data-facing client interface, the at least one administrative interface adapted for assembling at least one interconnecting functional unit substantially pre-coded to perform selected tasks, the tasks at least one or more of instructed by the user and instructed by data received through the at least one data facing client interface. The at least one interconnecting functional unit has at least one or more of at least one pre-coded form application and at least one pre-coded card application designed to perform interconnected workflow functions and to provide the capability to form software applications. At least one plugin interface operationally couples with at least one client data source via the at least one data facing client interface. A declarative language software program operably couples the at least one interconnecting functional unit.

20 Claims, 20 Drawing Sheets

FIG. 11

| | Step Name | Alias (Name) |
|---|---|---|
| Level 1 | Organization | |
| Level 2 | State | |
| Level 3 | Country | |
| Level 4 | Community | |
| Level 5 | Campus | |
| Level 6 | Building | |
| Level 7 | Wing | |
| Level 8 | Floor | |
| Level 9 | Room | |
| Level 10 | Individual | |

Admin

Access

Grant Access

Staff Access

Add Staff

Name

Start enter name for autocomplete ⌄

Choose rule

Select ⌄

Choose Levels

☐ Scale Campaign

Submit

41

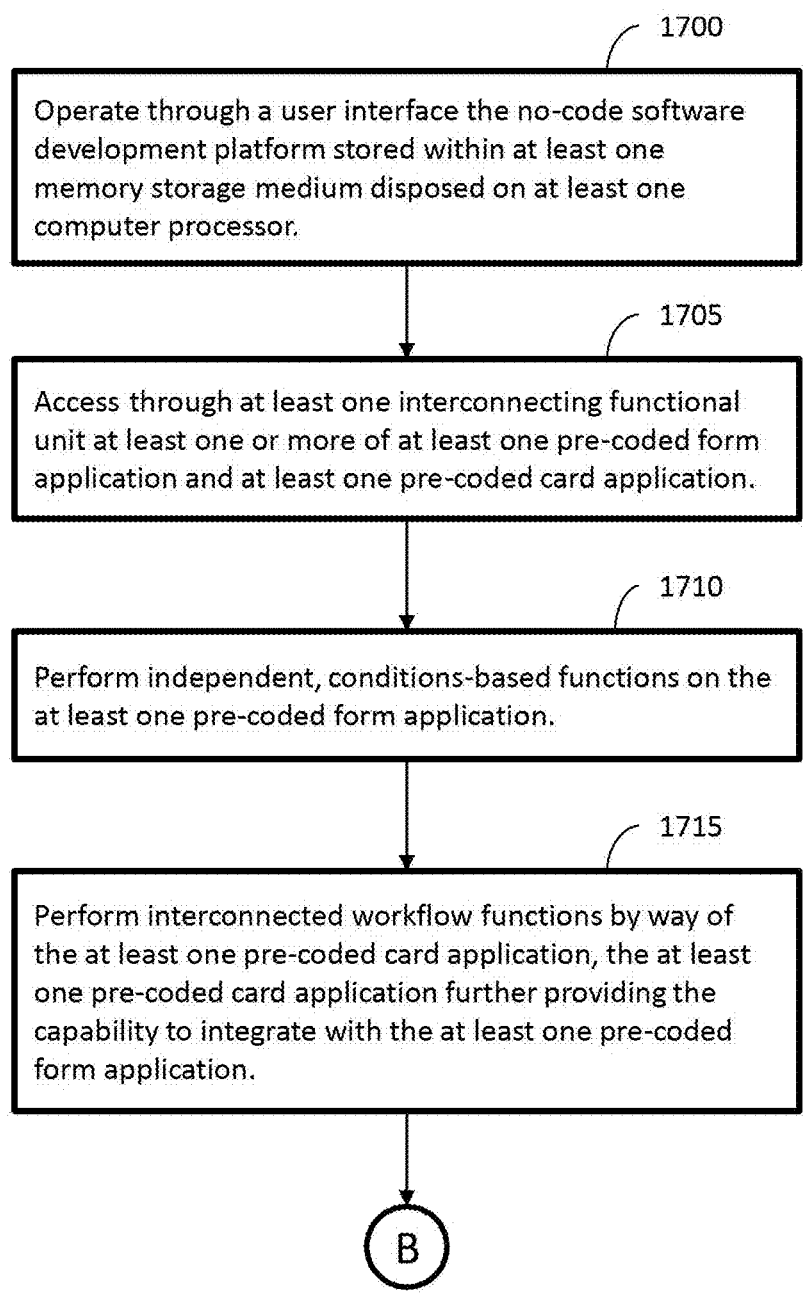

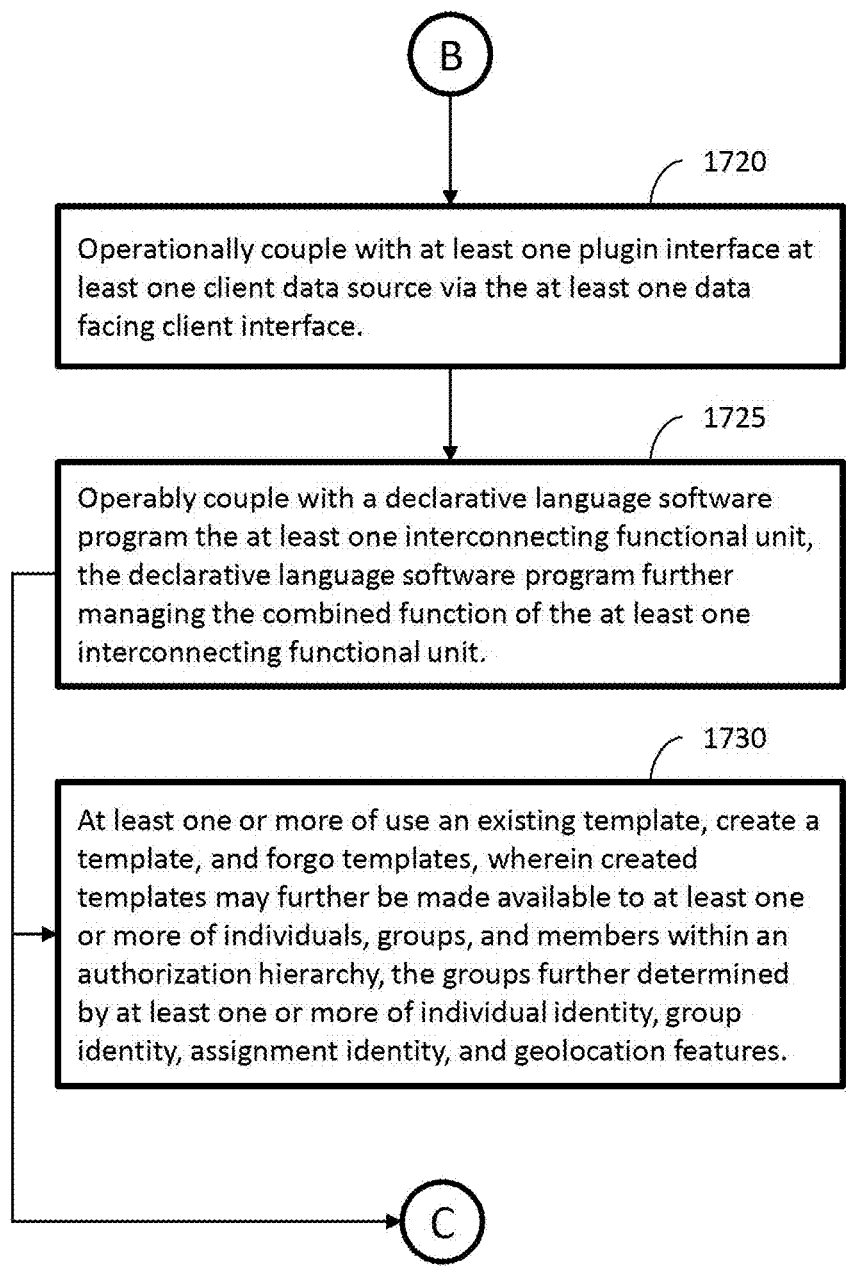

NO-CODE SOFTWARE DEVELOPMENT PLATFORM

CLAIM OF PRIORITY

This application claims priority to and the benefit of U.S. Provisional application patent application with Ser. No. 63/252,976, filed on Oct. 6, 2021, with the same title, which is incorporated herein by reference in its entirety.

FIELD OF THE INVENTION

The inventive concept relates generally to a no-code software development platform for building software applications.

BACKGROUND

Businesses are often unable to commit resources to maintain in-house application development. Nor may they be able to afford or justify the time and effort required to transfer domain knowledge to an outside developer. No-code platforms provide drag-and-drop tools designed to enable software application creation without code writing by users.

No-code development platforms allow users to create software applications typically through graphical user interfaces and configurations instead of through traditional computer programming. Traditional computer programming typically involves tasks such as: analysis, generating algorithms, profiling algorithm accuracy and resource consumption, and implementing algorithms in a chosen programming language, programming often referred to as coding. No-coding platforms have coding, but that coding is already built in to create functional units of software that can be combined to create a software application.

No-code development platforms are closely related to low-code development platforms wherein a low-code development platform provides a development environment used to create software applications typically through a graphical user interface instead of through traditional computer programming. A low-coded platform may produce entirely operational applications or require additional coding for specific situations such as to allow one functional unit of code to interface with another.

No-code and low-code development platforms reduce the amount of traditional computer programming required to produce software applications, enabling accelerated delivery of software applications. A common benefit of both is that a wider range of people can contribute to the software application's development, not only those with coding skills.

Currently, however, no-code development platforms and low-code development platforms have tradeoffs. Even no-code development platforms may require coding to develop software applications without compromising developing the software applications the way users want, the compromises based on limitations inherent in the functional units available and how those functional units may be interconnected. Interfaces may lack universality, forcing users to compromise functions that ease and attract end-users in favor of form, function, and ease of building software applications, a weakness that can force enterprises to put the customer second instead of first. Developers present the best-possible-fit to end-users limited by no-code and low-code functional units instead of the best-fit solution for end-users as could be produced with bespoke coding. Therefore, there is a need for an improved no-code development platform for developers and for end-users who will engage the resulting software applications.

SUMMARY OF THE INVENTION

Disclosed is a no-code software development platform having at least one computer processor with a memory storage medium on which operates the no-code software development platform. The no-code software development platform, in some embodiments, has an at least one user-facing administrative interface for application development and at least one data-facing client interface, the at least one administrative interface designed for assembling at least one interconnecting functional unit substantially pre-coded to perform selected tasks, the tasks either or both instructed by the user and instructed by data received through the at least one data facing client interface. The at least one interconnecting functional unit has at least one or more of at least one pre-coded form application and at least one pre-coded card application. The at least one pre-coded form application is designed to perform independent, conditions-based functions. The at least one pre-coded card application is designed to perform interconnected workflow functions and to provide the capability to integrate with the at least one pre-coded form application. At least one plugin interface is operationally coupled to at least one client data source via the at least one data facing client interface. A declarative language software program operably couples to the at least one interconnecting functional unit, the declarative language software program further managing the combined function of the at least one interconnecting functional unit.

In one embodiment of the no-code software development platform, the no-code software development platform operationally interfaces with at least one or more of a customer resource management program and an enterprise resource platform.

In one embodiment of the no-code software development platform, the software application developed by the no-code software development platform at least one or more of processes data received through the at least one client interface and receives data processed by the at least one data source operationally coupled to the at least one plugin interface.

In one embodiment of the no-code software development platform, at least a portion of the data received through the at least one client interface is at least partially processed by at least one machine learning algorithm.

In one embodiment of the no-code software development platform, the declarative language is based on JavaScript Object Notation (JSON) format.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIG. 11 illustrates representative administrative levels;

FIG. 12 illustrates a representative administrative permissions page;

FIGS. 17A-17D illustrate a representative no-code software development platform method.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
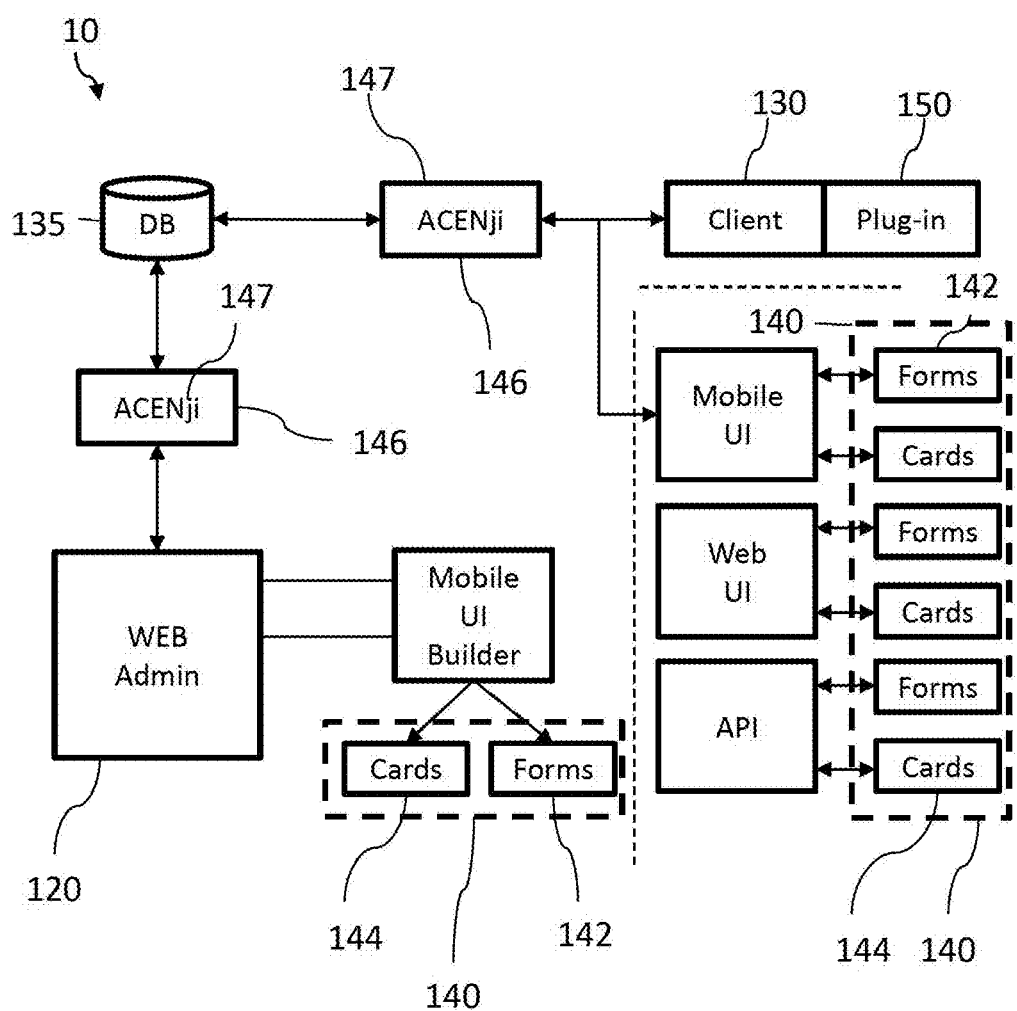
FIG. 1 illustrates a representative no-code software development platform schematic.
Figure 2:
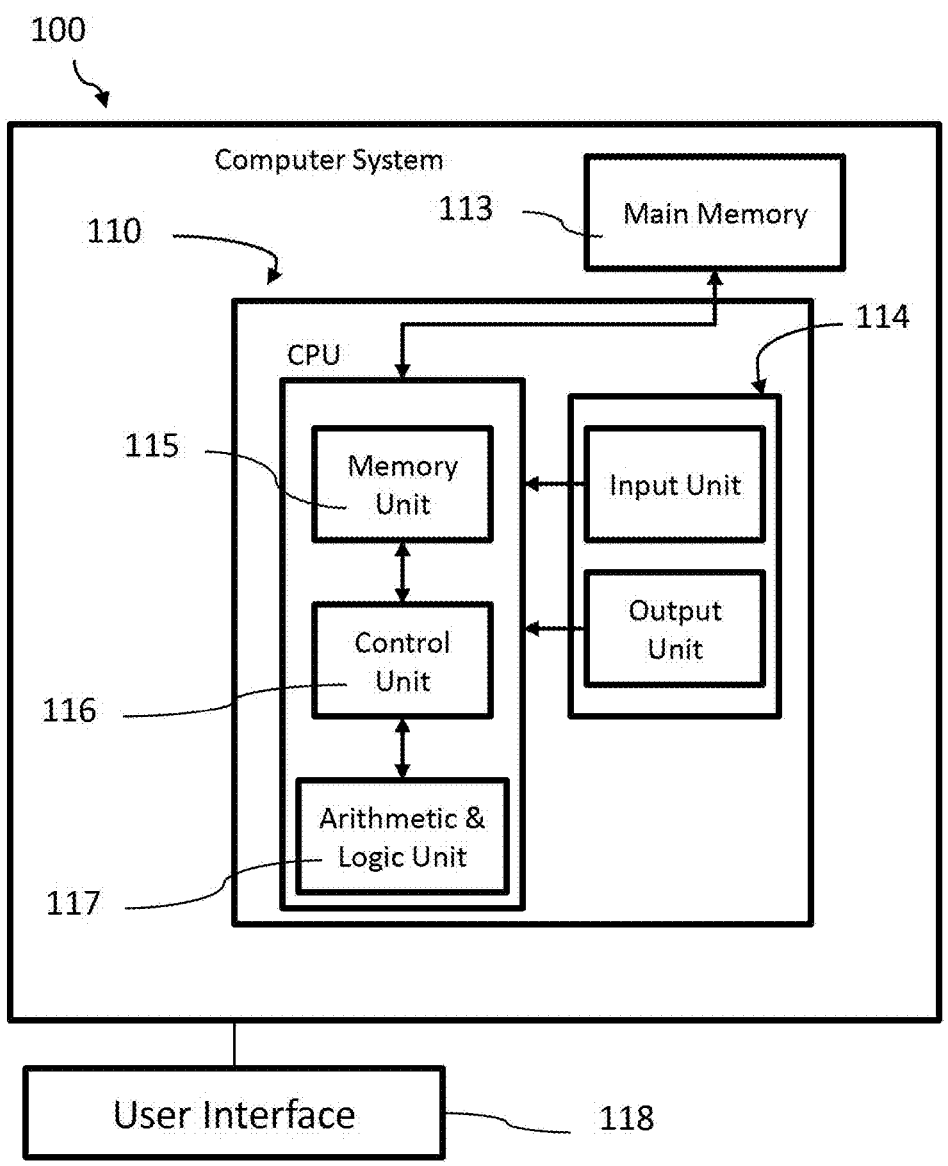
FIG. 2 illustrates a computer processor operable with a memory storage medium.
Figure 3:
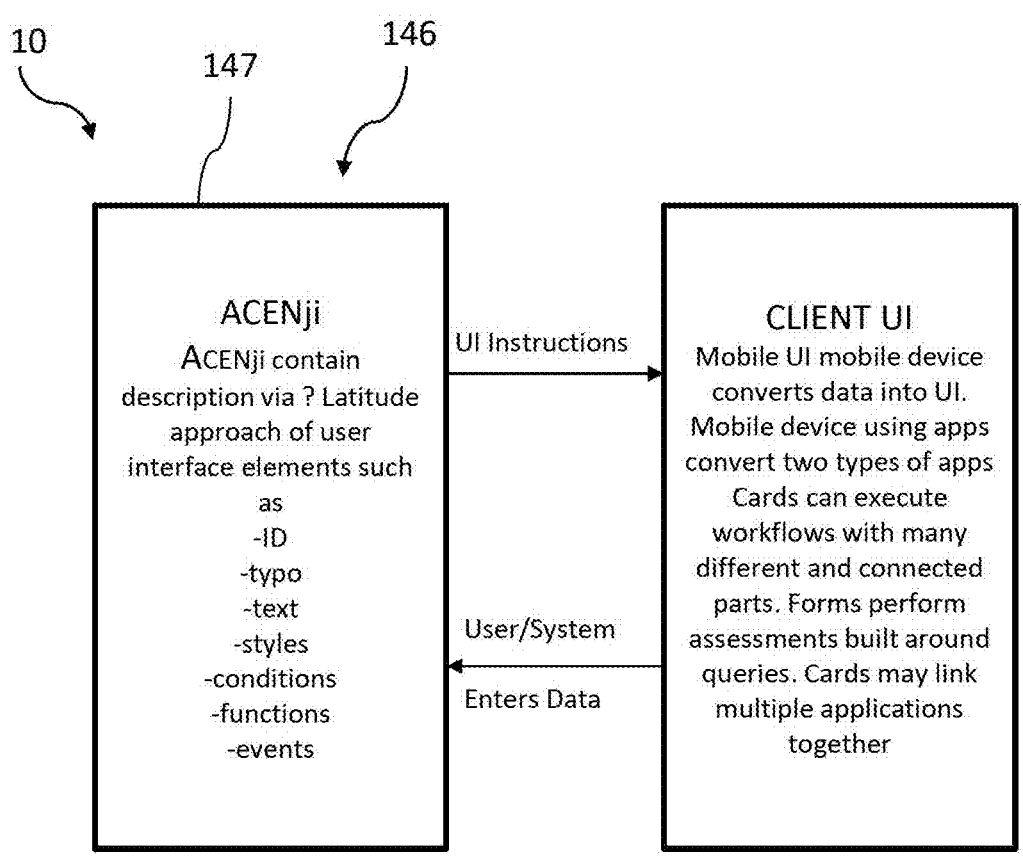
FIG. 3 illustrates an ACENji declarative language interface with a representative client interface.
Figure 4:
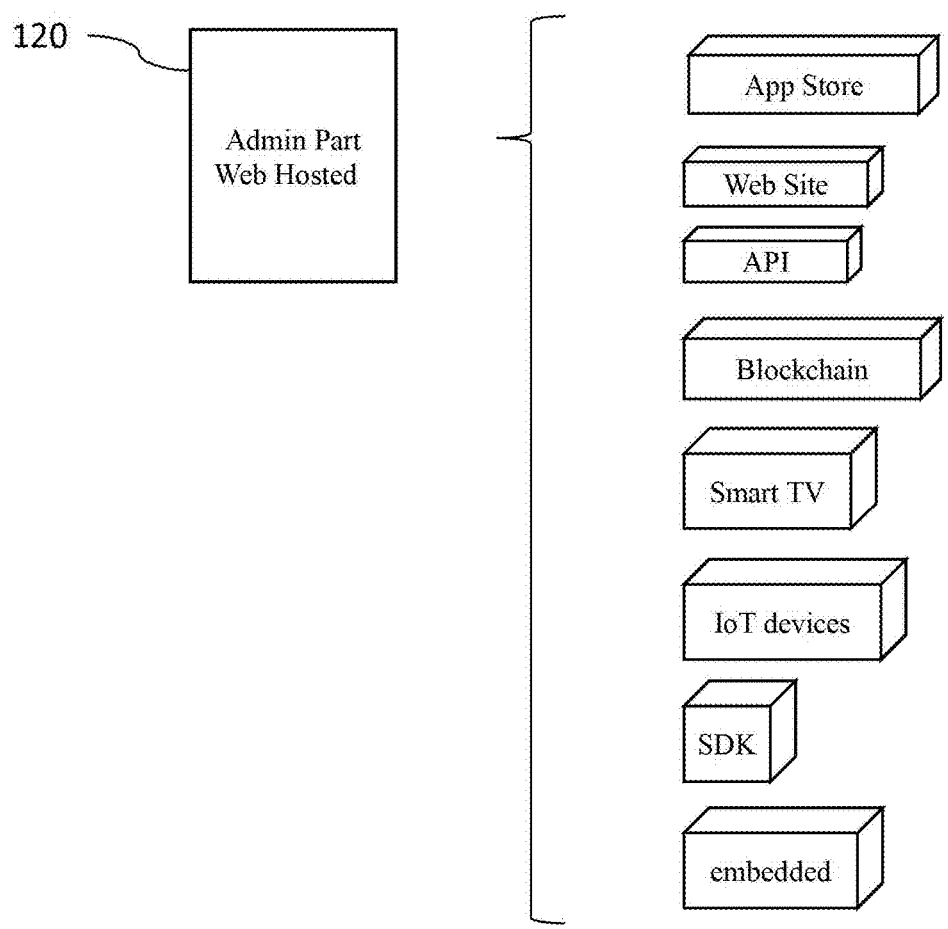
FIG. 4 illustrates a Web interface to Web elements.
Figure 7:
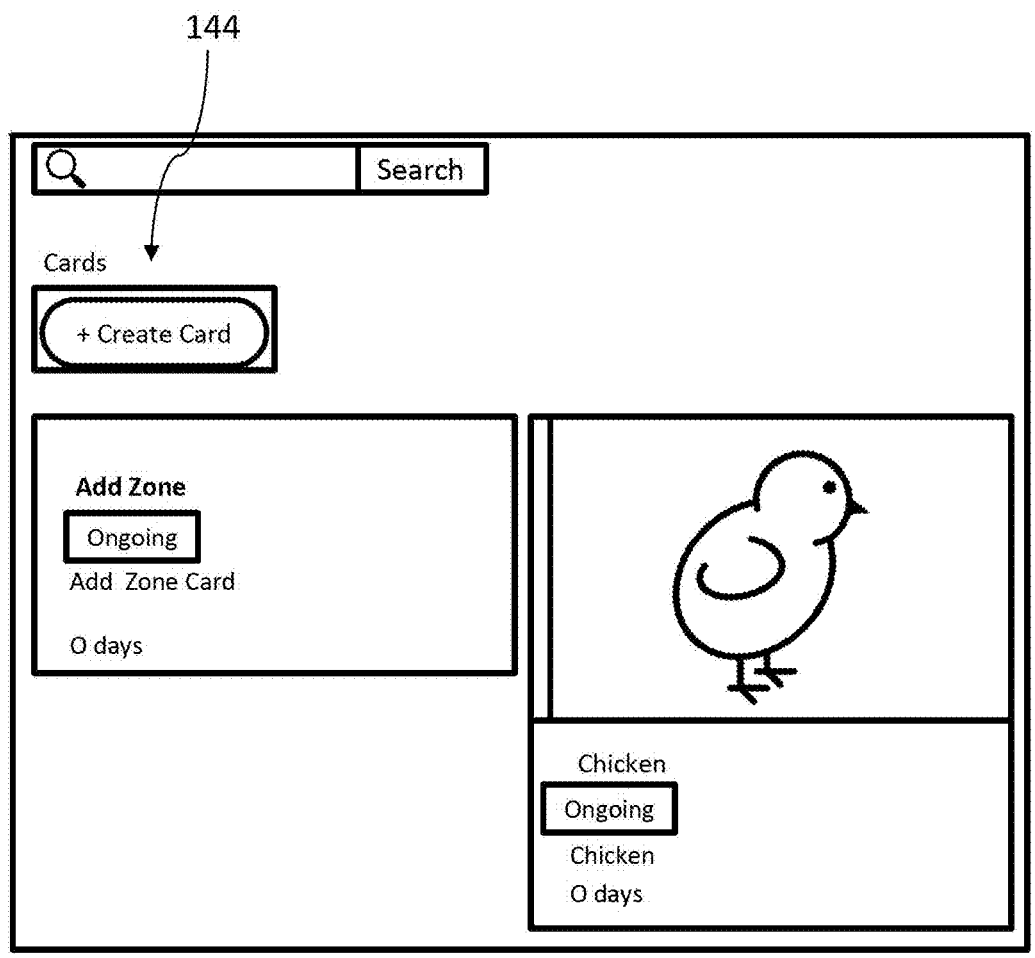
FIG. 7 illustrates a representative pre-coded card application.

FIGS. 1-2 illustrate a representative no-code software development platform 10 having at least one computer processor 100 operable with a memory storage medium 115 on which operates the no-code software development platform 10. The no-code software development platform 10, in this exemplary embodiment, has, as further illustrated in FIG. 4, an at least one user-facing administrative interface 120 for application development and at least one data-facing client interface 130, the at least one administrative interface 120 designed for assembling at least one interconnecting functional unit 140 substantially pre-coded to perform selected tasks, the tasks either or both instructed by the user and instructed by data received through the at least one data facing client interface 130. In this exemplary embodiment, the user interface 118 is a part of at least one or more mobile, Web, embedded, desktop, and other devices driven by the one or more computer processors 100. Other embodiments may lack either or both the interfaces 120 and 130. The at least one interconnecting functional unit 140 has at least one or more of at least one pre-coded form application 142 and, as illustrated in FIG. 7, at least one pre-coded card application 144. The no-code software development platform 10 includes at least one plugin interface 150. The at least one pre-coded form application 142 is designed to perform independent, conditions-based functions. The at least one pre-coded card application 144 is designed to perform interconnected workflow functions and to provide the capability to integrate with the at least one pre-coded form application 142. The at least one plugin interface 150 is designed to operationally couple with at least one client data source 135 and, in some embodiments, may do so via the at least one data facing client interface 130. A declarative language software program 146 operably couples to the at least one interconnecting functional unit 140, as further illustrated by FIG. 3, the declarative language software program 146 further managing the combined function of the at least one interconnecting functional unit 140.

FIG. 2 illustrates an exemplary computer processor central processing unit (CPU) 110, also called a central processor or main processor, which is the electronic circuitry within the representative at least one computer 100 that executes instructions that make up a computer program. The CPU 110 performs basic arithmetic, logic, controlling, and input/output (I/O) operations specified by the instructions in the program.

An arithmetic and logic unit (ALU) 117 is a combination digital electronic circuit that performs arithmetic and bitwise operations in integer binary numbers. Traditionally, the term CPU 110 refers to a processor, more specifically to its processing unit and control unit (CU) 116, distinguishing these core elements of a computer from external components such as main memory 113 and input output (I/O) circuitry 114. The CPU 110 may also contain memory 115. Memory 115 refers to a component that is used to store data for immediate use in the computer 100. A user interface 118 is illustrated on this representative embodiment operationally coupled to the at least one central processing unit (CPU) 110 having the at least one memory unit 115.

The representative embodiment is an exemplary no-code software development platform 10 through which software programs having different and connected parts operably coupled to each other may be created, distributed, and maintained by users, to include users lacking the programming skills of software developers of ordinary skill in the art with such users, hereafter, referred to as unskilled. Users of the no-code software development platform 10 can also be skilled.

The no-code software development platform 10 allows unskilled users the power and control to create and share software products, to include levels of performance considered suitable for commercial distribution, without needing skills in any developmental software language, wherein unskilled users may focus their creativity on their own domain knowledge as it applies to using the disclosed no-code software development platform 10. The no-code software development platform 10 further reduces the requirement to communicate software program ideas to software developers wherein miscommunication is a risk.

The risks addressed by the no-code software development platform 10 include the possibility that software developers will forgo developing the software programs unskilled users want in favor of what the software developers believe the unskilled users need. The risks further include software developers developing software programs without industrial domain knowledge, meaning the software developers may lack an intuitive feel for how to minimize obstacles for software program adoption from those people associated with the unskilled users. Such risks can be summarized in terms of 1) how proficiently a challenge addressable by a software program may be assessed, 2) how a solution may be decided upon, and 3) how a solution may be created and implemented, where it would otherwise fall upon the unskilled user to communicate the best orientation for success to a software developer from the framework of industry domain knowledge in order to obtain the practical and psychologically best-fit software program required for given tasks.

Figure 6:
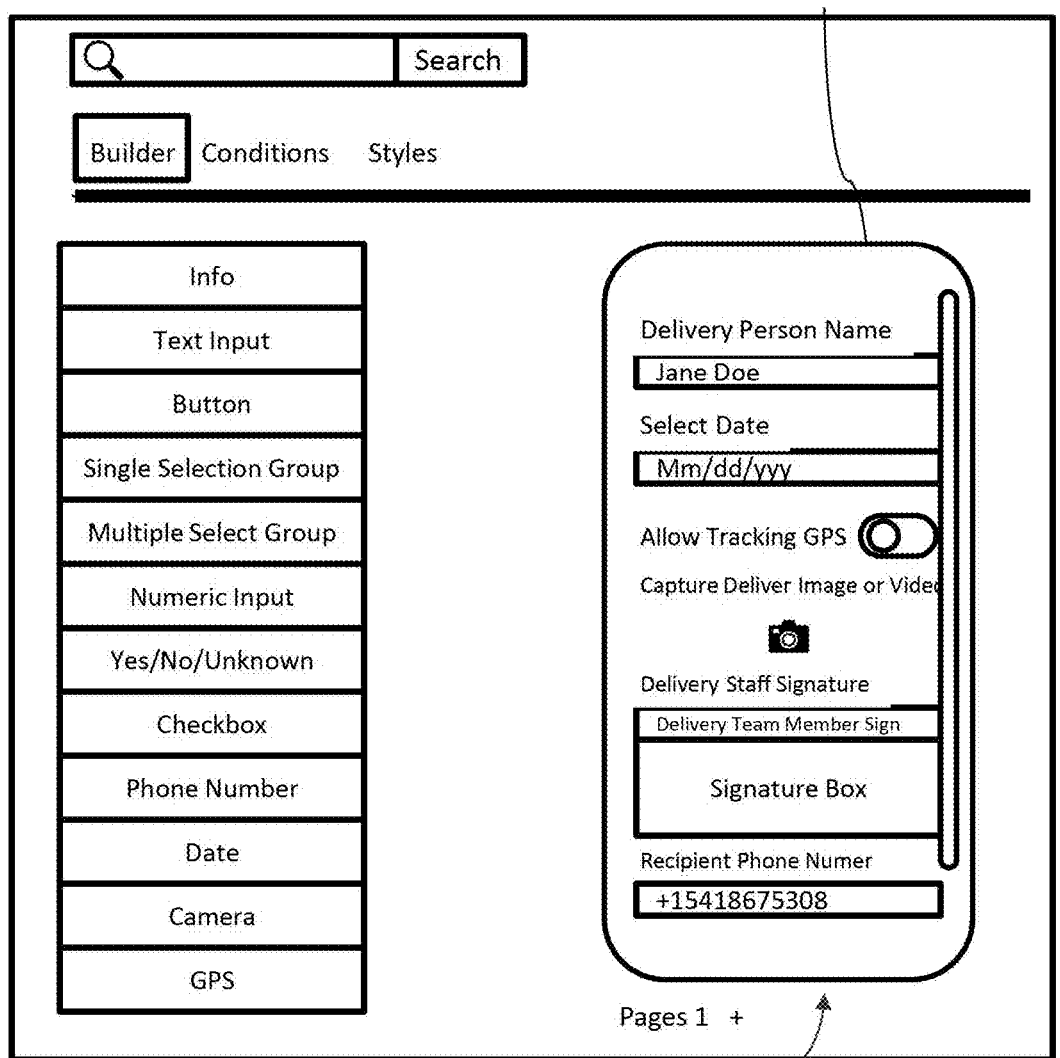
FIG. 6 illustrates representative pre-coded form applications disposed on a representative smartphone.

One embodiment of the disclose no-code software development platform 10 is designed to extend at least one or more of existing customer resource management programs (CRM) and enterprise resource platform (ERP) systems on, as illustrated in FIG. 6, a selected computerized device 20 at a selected location and time and with consideration for required security. One embodiment of the disclosed no-code software development platform 10 is designed to create stand-alone products on the selected computerized device 20 at a selected location and time and at the required level of security. The no-code software development platform 10 is designed to work substantially entirely as a no-code software development platform 10, meaning no coding is required to build the complete interfaced software application.

The disclosed no-code software development platform 10 is designed for creating mobile apps, Web sites, and API's, in a variety of hardware environments running a variety of commercial operating systems, interfacing with common hardware and software environments often used by enterprises, the no-code software development platform 10 operable in some embodiments having the representative user interface display 118. The no-code software development platform 10 includes the declarative language 146 (ACENji) 147 designed to provide users in current and future technologies a substantially entirely no-code solution. ACENji 147 is focused on bridging the gap between industry domain knowledge and the final software product.

Declarative languages 146, also called nonprocedural or very high level, are programming languages in which a program substantially specifies what is to be done rather than how to do it. Pre-coded features and options for creating software applications are hidden from users, allowing users to focus more on what their application does—product features and flow of their process workflow—than on how their application does it.

The no-code software development platform 10 allows users—skilled and unskilled—with an algorithm in mind for their desired custom solution to, as illustrated by FIG. 6, simply drag and drop (or use voice navigation) tiles 30 representing pre-written packages of code that will assemble as interconnecting functional units 140 necessary behind the interface to result in a completed software application, software applications that can then be hosted on selected computerized devices 20 such as mobile devices, cell phones and tablets, servers, Web-based computers, and personal computers. Exemplary devices include, but are not limited to, mobile marketplaces such as Apple Store and Google Play using types of mobile devices such as: cellphones, tablets, watches, smart TVs, smart walls, and embedded IoT hardware. Capabilities may include, but are not limited to:

Custom hierarchy-based access authorization granted by specified locations and roles in web and mobile systems 40, as illustrated by FIG. 11.

Figure 13:
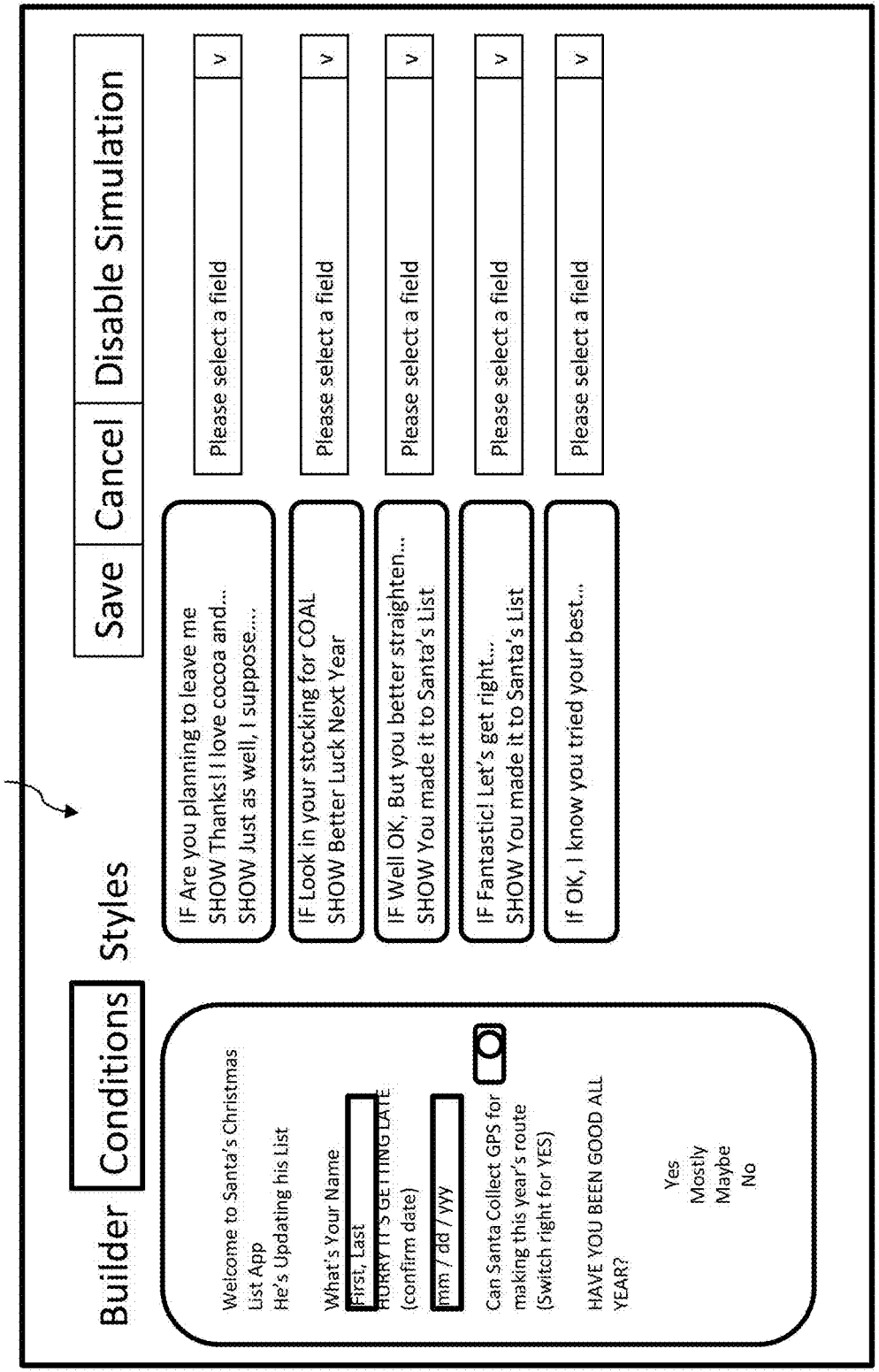
FIG. 13 illustrates a representative administrative levels page.

Graphic representation of mobile hierarchy in super administrator interfaces 41, as illustrated by FIGS. 12 and 13.

Mobile access authorization by super administrator interfaces 41 to simulate mobile user activity without using passwords.

Custom software development language (ACENji) 147 which enables no-code rapid software application development of application assignments, conditions, and graphical layouts.

An ability to create no-code mobile software applications that include a multi-layered, drill-down hierarchy of inventory with rich user interfaces (including, but not limited to, PDF's, videos, text, pictures, checks, etc. on the cards).

An ability in the mobile user application to select from defined inventory (PDF link files) and send them as PDF attachments via email instantly from the mobile software application (pre-defined or dynamically added email recipients).

An ability regarding the at least one pre-coded form application 142 to dynamically link and share data between multiple mobile software applications, the data flow enabled as "bottom-up" and "top-down."

An ability regarding the at least one pre-coded form application 142 to combine use of multiple mobile software applications into use seamlessly as one within user experiences.

One embodiment of the disclosed no-code software development platform 10 allows multiple applications to operate inside the same environment without requiring separate applications. In one embodiment of the no-code software development platform 10, the software application entity resides within an administrative system 122 and is pushed out to distribution. In one embodiment of the no-code software development platform 10, users can make the software application available in application stores and allow the software application to be pulled on demand.

Embodiments of the no-code software development platform 10 are designed to be Health Insurance Portability and Accountability Act (HIPAA) compliant. Passwords are unshared, and technical support users can verify each individual account user for either administration or for each subordinate user using predefined features to simulate user activities. Multiple tiers of users may exist to include super administrator users coordinating with other users.

One embodiment of the no-code software development platform 10 focuses on three primary and unique valued functionalities that include at least one or more of at least one pre-coded form software application 142, at least one pre-coded card software application 144, as illustrated by FIG. 7, and at least one plugin interface 150. The at least one pre-coded form software application 142 is designed to perform independent, conditions-based functions, and in some embodiments is designed to operably couple with at least one or more CRM and ERP platforms.

Pre-coded form applications 142 stand alone as software applications and are not combined or cross-communicated with other form applications 142 or card applications 144 to create more complex logic solutions. However, internal to each pre-coded form application 142 is several layers, or pages and multiple element choices that can all be integrated into logic algorithms using conditional logic functions. Conditional functions allow for classical if x, then y, else z, and do-while operational elements found at the foundation of computer coding. Further, these functions are available to the user without the need to understand computer code languages. Pre-coded form applications 142 are used to bring multiple featured elements into an emulated device space within an administrative editor environment 124 of the at least one administrative interface 120 and allow for users to design and create custom software applications. The no-code software development platform 10 also allows new elements to be created within third-party CRM/ERM platform applications as plugin interfaces 150.

Several pre-constructed templates are available to users as a starting point from which to clone and edit bespoke software applications. Users may also start without templates, create new templates, and reuse templates. Further, software applications they create can be made available for group or specific individual authorizations using a hierarchy authorization function within the administrative editor 124 and a role and geolocation feature useful for determining assignments and where a given user operates.

Figure 5:
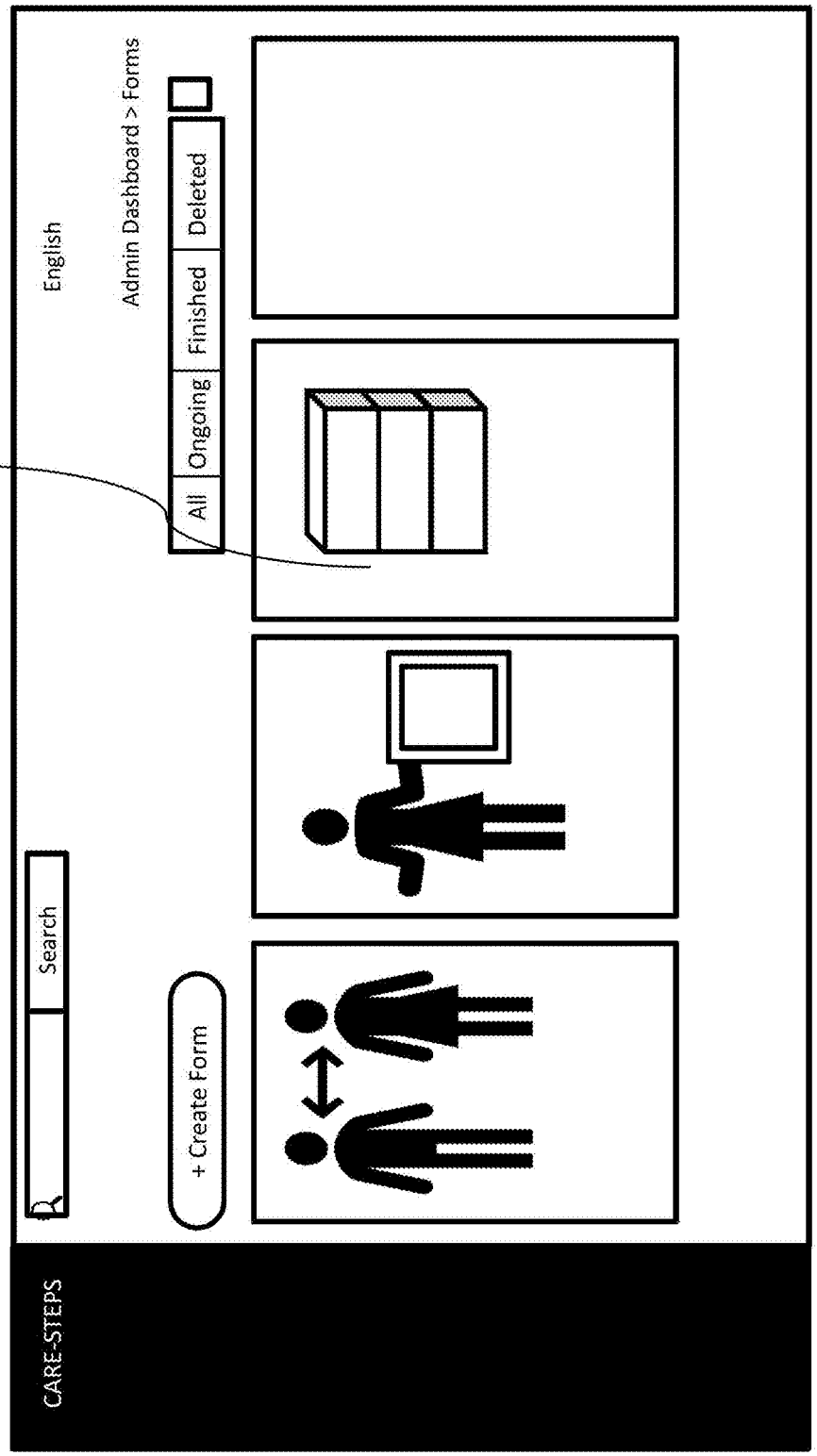
FIG. 5 illustrates a representative pre-coded form application.

Illustrated in FIG. 5 is representative scenario for creating the at least one pre-coded form application 142 is for the given administrative user to click a "create form" button in an administrative editor 124 of the administrative interface 120, then add a form "Title" and a short description supporting the title to inform other users of what the given pre-coded form application 142 function is intended to do. The form creator (admin/user) may add an image. Adding an image 143, as illustrated in FIG. 5, is optional but recommended to aid users in future form menus to identify their applications, enhancing the visual appearance of the distributed software application created via the no-code software development platform 10 to remote users.

Without further logic (element) construction, on the representative embodiment, the administrator/creator must "save" the given pre-coded form application 142, which will make the given pre-coded form application 142 available as a software application, yet at this point the system creates an empty pre-coded form application 142 that is ready for editing into a useful software application tool. System configuration is triggered to manage the software application, invisible to the administrative user via the ACENji development language 147, the ACENji development language 147 creating a completely automated and seamless, graphic emulated drag and drop, fill in the blanks, etc., game-like user interface experience as the skeleton of the desired future pre-coded form application 142.

ACENji 147 is, as noted, a declarative language 146 that manages such elements as:
Workflows
Functionality
Order of Operations
Conditional Logic
Elements Settings
Layout, Format, and Style
Action Commands and "Required/Optional" Conditions
Additional Choice Options and Required Response Format and Behavior
Overall Interface Format, Image, and Color Options
Turnkey Mobile application Deployment via Common iStores (Google, Apple, etc.)

ACENji's 147 declarative language 146 allows scaling and creating workflows consisting of many different and connected parts. Pre-coded form application creation allows multiple pages to be driven by desired conditional logic, which drives the pre-coded form application user workflow to move from page to page, requiring only the path selected by the administrative user who may be an unskilled user. This approach ensures software application users can access substantially all possibilities yet follow only the steps of the process sequence needed to be performed to the administrative user's preferences.

Figure 8:
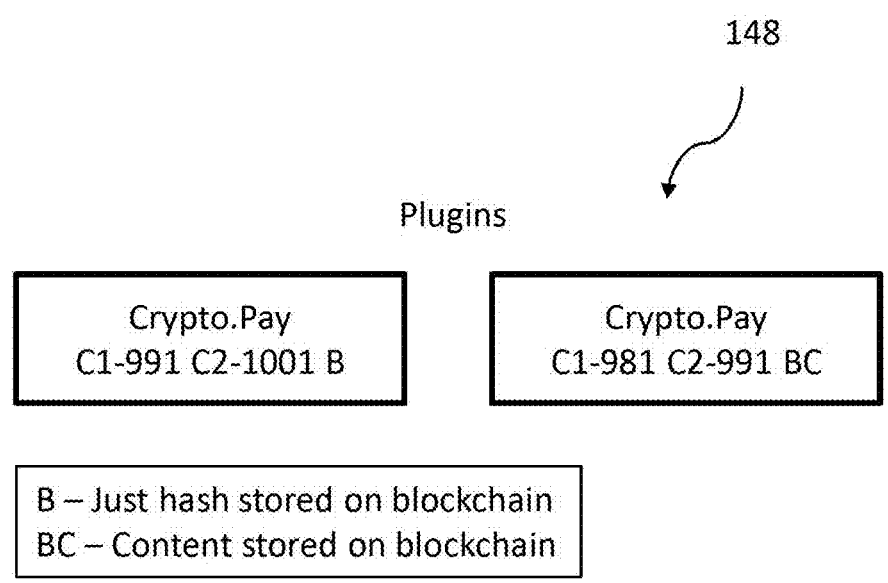
FIG. 8 illustrates representative blockchain plugins.

In some embodiments, multiple users may be involved in building an application software, therefore requiring the at least one administrative interface 120. When users use the no-code software development platform 10, an audit trail may be triggered. User sessions may be captured with the exact preferences of detailed information collected and retrieved for subsequent use in the administrative interface 120 (the administrator's domain). Collected session information may be compiled for an individual session or for an interval of time, as desired by the administrator. These collected data files are available to be at least one or more of exported via flat file, pushed via API to third party systems, and stored on public or, as illustrated in FIG. 8, private blockchain 148. In addition, a simple hash may be used to store on blockchain to validate the audit trail.

Pre-coded card applications 144 differ from pre-coded form applications 142. Pre-coded card applications 144 use the ACENji language 147 to facilitate creating workflows, the workflows having dynamic screens. Users can build individual dynamic card-built applications, then combine unlimited numbers of card-built applications into a seamless single application experience without disclosing to the users of the created software application that these pre-coded card applications 144 are segregated. A user may create a virtual ecosystem through which to organize and reuse the user's no-code software development platform creations. The user experience is seamlessly executed by knitting together manageable smaller algorithms into a fabric, which can have many different and connected parts yet still be manageable in smaller pieces. To create a pre-coded card application 144, the user opens the no-code software development platform 10, navigates to the appropriate menu and selects "Create Card," as illustrated in FIG. 7.

As with pre-coded form applications 142, a pre-coded card application 144 needs to be initially defined with a name and brief description, then saved. Upon reopening the administrative editor 124, the user will build desirable functionality similar to the form builder. The pre-coded card applications 144 include additional behaviors such as functions and events. Functions then can be separated into predefined actions in which special features may be defined and applied. Pre-coded card applications 144 allow users to tie together tasks and logical sequences in smaller pieces that eventually can be built to define workflows consisting of many different and connected parts. By parsing complexity into smaller, pre-coded card applications 144 and knitting them together into a fabric of software applications, screens, events, and wired thought. Data and logic can flow in multiple directions simultaneously.

The no-code software development platform 10 allows new elements to be created within most third-party CRM and ERP platform applications as a plugin via the plugin interface 150. CRM/ERP features of the no-code software development platform 10 include at least one or more of:
Lead Generation
Lead Tracking
Calendar, Appointment Scheduler
Event Organization
Project Management
Push Notifications
Geofencing Functionality
Mapping Route Generation
Canvasing Map Creations In one embodiment, of the no-code software development platform 10, Symantec environment facilitates plugin capabilities to be created and shared. The plugin interface 150 is designed to encourage third parties to use the developed software applications and to recommend and request new elements germane to needs. Testing methods use at least one or more of C1 (statement coverage) and C2 (branch coverage) wherein C1 stands for statement coverage and C2 for branch or condition coverage. When a given plugin interface 150 is deployed for use, C1 and C2 displays the percentage coverage. A plugin is designed for use only at substantially greater than 90% coverage for manual selections. The next level of testing is performed as an automatically complete semantic Web-like system where the system chooses which plugin to employ in application construction. In this case, both C1 and C2 achieve coverage of substantially greater than 99% for acceptability. Each plugin interface 150 may include a precondition. Executive and post-condition are described by the ACENji 147.

To prevent fraudulent activity when a plugin request is sent for an approval seal, a hash of the original plugin artifacts may be hashed and stored on a public blockchain ledger. An opt-in section of metadata may be mandatory for the requestor in the "On" condition. If fraudulent activity is sensed, the plugin interface 150 makes an instant comparison of the hash to the original hash. If the hash codes do not match, a security alert is sent. Approval seals in some embodiments mark plugins ready for use in manually and automatic settings. Differentiated approval seals may be provided for manual plugins and for automatic semantic Web-type plugins. Predefined software applications also may have two seals: one showing the coverage code and another showing if the software application is semantic made. A third type of approval is available to employ, ensuring that the blockchain code hash matches artifact hash code.

In some embodiments, the no-code software development platform 10 includes predefined templates that group categories by hierarchy. These will follow the coverage and approval seal "S" for the given blockchain 148. Blockchain approval seals in some embodiments may be checked at least one or more of once per day, once per hour, and as a read-only process.

The disclosed no-code software development platform 10 is designed to be agnostic about the origins of data and which format schema is employed while uploaded. The incoming data source may be in a discrete file such as filename.csv or Excel, Google Sheet, AirTable, and other data spreadsheets. Alternatively, data may be imported from a relational (NoSQL) database or other common types of Application Program Interfaces (API). There are steps within the representative process to identify the parametric entities in play (of interest and digital value) from the entire accessed set of data. Decisions regarding whether to set an appropriate schema automatically or manually may use artificial intelligence algorithms built-in as integral intellectual properties of the no-code software development platform 10.

The disclosed no-code software development platform 10 may apply machine learning, combined with manual parameter selection allows users to easily process data files without burdensome constraints on file formatting prior to uploading. Machine learning may include one or more of decision trees, neural networks, Bayesian networks, genetic programs, nearest neighbor, and other strategies as may be devised.

Figure 9:
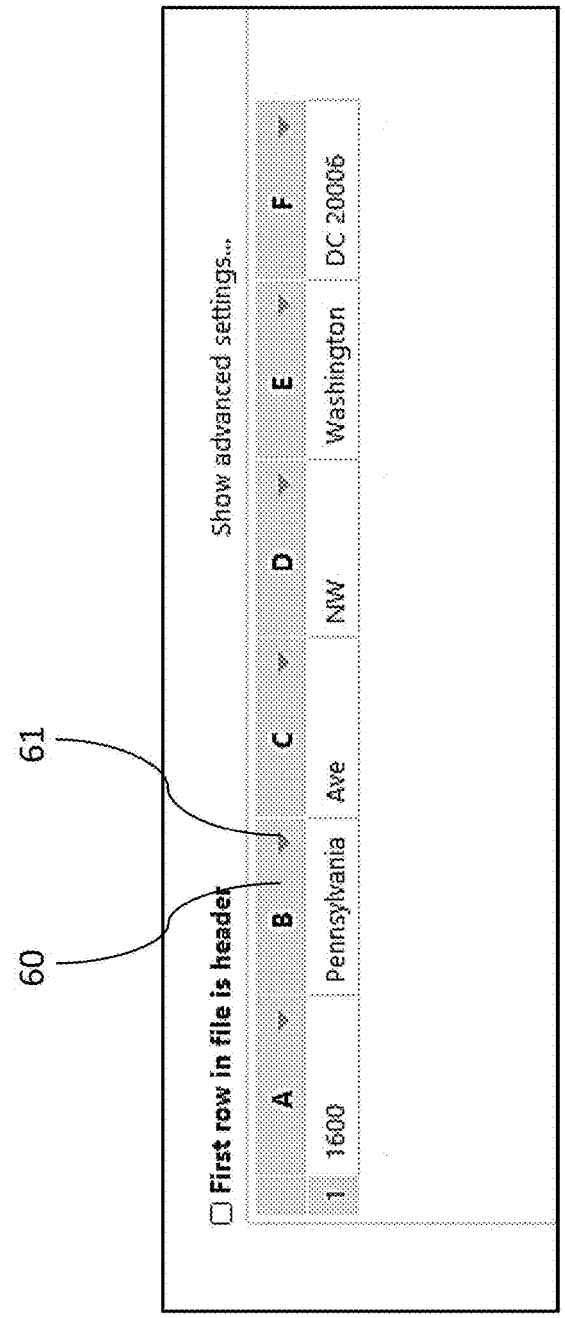
FIG. 9 illustrates representative file headers.

As illustrated by FIG. 9, within the no-code software development platform 10, users are allowed to enter files that may or may not include header data tags 60. If headers do not exist, the no-code software development platform 10 may apply a machine-generated header data tag 60. Machine learning may aid in defining machine-generated headers. In one embodiment, as further illustrated in FIG. 9, the user sees on the user interface 118 a small triangle/arrowhead 61 facing down to indicate this action. The user may click anywhere in the header to initiate proper selection.

Figure 10:
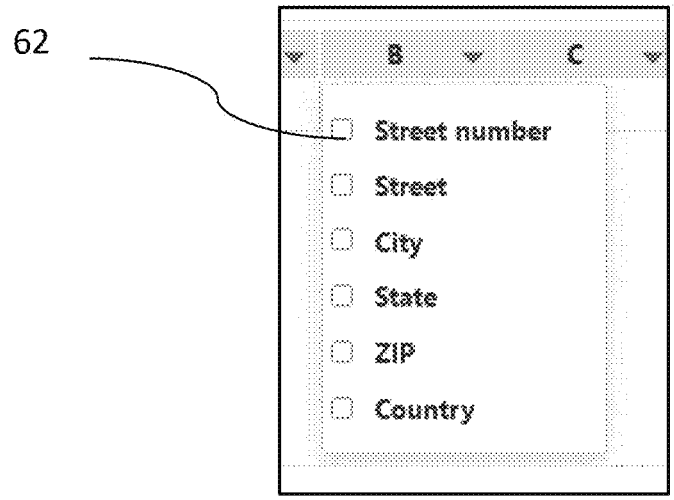
FIG. 10 illustrates representative file headings.

As illustrated by FIG. 10, in the representative embodiment, when a given user clicks on a given header, a drop-down menu opens with the no-code software development platform 10 and offers predefined data parametric header types 62. Users may then select the most appropriate predefined data parametric header type 62 from the menu of existing types. Guidance allows only one predefined data parametric header type 62 per column. If the exact (user-desired) predefined data parametric header type 62 is not included in the menu, the user may select "text type" as a default.

FIG. 10 further illustrates that when the user clicks on a given predefined data parametric header 60, a drop-down menu opens with the no-code software development platform 10 common predefined data parametric header types 62. Users may then select the most appropriate header from the menu of existing header types 62. Guidance allows only one header type 62 per column. If the exact (user-desired) header type 62 is not included in the menu, the user may select "text type" as the default. The example provided is an exemplary illustration of how parametric header type 62 assignments work.

FIG. 11 illustrates representative administrative levels 40. FIG. 12 illustrates a representative administrative permissions page 41. FIG. 13 illustrates a representative administrative levels page 133.

Figure 15:
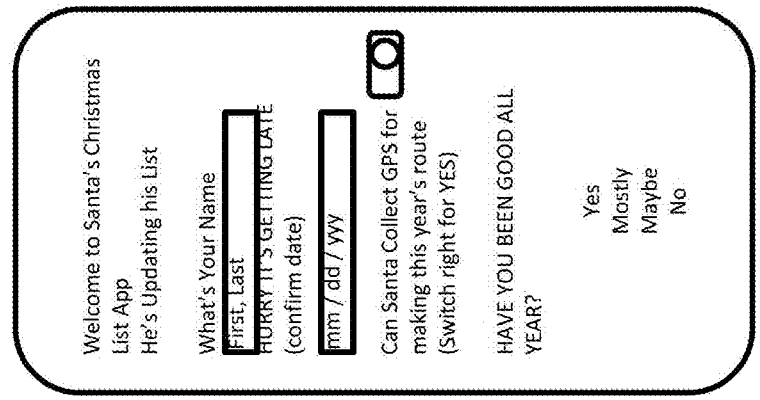
FIG. 15 illustrates a representative themes administrative page.

As illustrated in FIG. 15, the column header may change color to indicate a selection has already been assigned. Users may designate multiple columns having the same header type 62. Users may combine multiple header types 62 inside the same column, separated by a comma. The order of such selections is based upon the order of the list. Users may export the data source at any time in formats such as csv, excel. The no-code software development platform 10 software application may supplement additional meta data inside the header of the file for operational purposes.

Declarative language 146 ACENji 147 is based on JavaScript Object Notation (JSON) format and allows the ability to scale to substantially unlimited numbers of different and connected parts on the no-code development platform 10. JSON is an open standard file format and data interchange format that uses human-readable text to store and transmit data objects consisting of attribute-value pairs and arrays or other serializable values, the data format having a diverse range of functionality in data interchange including communication of Web applications with servers.

ACENji 147 in one exemplary embodiment covers the following: 1) elements, each element defined by attributes such as but not limited to id, icon, label, optional, question id, question text, date format, calendar, gps, and more, ACENji 147 supporting elements of contemporary HTML supports, combinations of some elements also grouped as separate elements; 2) survey type questions and answers, each question defined with its own attributes, for example:

```
"questions": [
    {
        "id": "config-Info-0",
        "icon": "mdi mdi-information-outline",
        "label": "Info",
        "optional": true,
        "questionId": "Info-1",
        "questionText": "Welcome to Santa's Christmas List
app. He's updating his list !",
        "questionType": "Info"
```

-continued

```
   },
;
```

Figure 14:
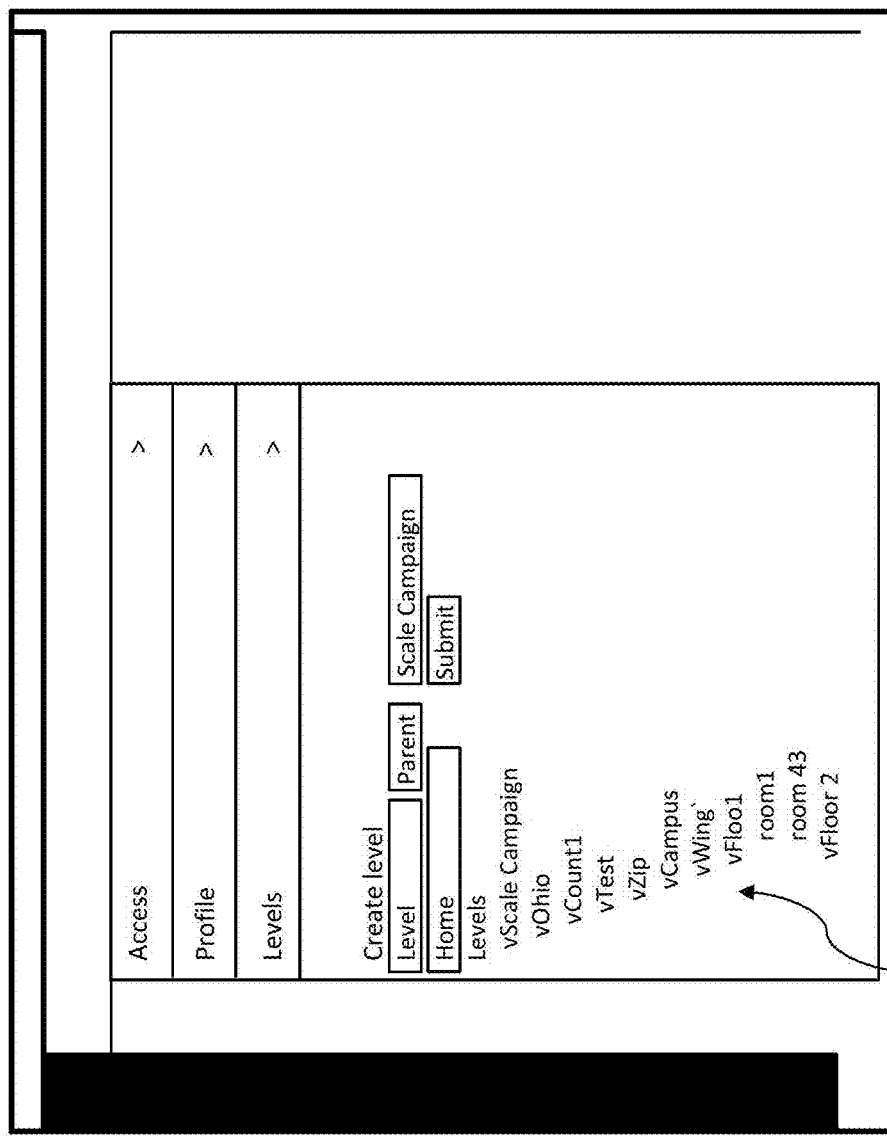
FIG. 14 illustrates a representative conditions-based administrative page.

3) assessment type questions—variety of answers, supporting the ability for a user to be flexible and group more than one question under a single question, also giving the ability to spread the answers across more than one answer; 4) condition logic—supports, as illustrated by FIG. 14, offering nested conditions of substantially unlimited different and connected parts, ACENji 147 separating the conditions as separate sections, conditions being declarative wherein one side of the conditions are always true and the rest are false by default, affording the ability to group and create hierarchy and order conditions even outside normal conditional logic, conditional logic being a set of either or both rules and conditions that cause the disclosed process elements to change based on if/then input, each element visually testable in an associated simulator while building the conditions, users always having the ability to disable the simulator if desired, conditions allowed to be edited, deleted, cloned, or disabled on the fly with associations with other conditions effected immediately after the change; 5) actions supporting add, remove, edit, delete, further supporting the ability to create unlimited actions associated with at least one or more of apps, screens, and single assessment entries by users either or both online and offline, either or both done by them and done by other individuals; 6) supports of modal windows, offering the ability to create rich environments that are like real interactive end user via opening other windows and giving users good choices for action; 7) support pined windows, allowing creators of software applications to anchor specific sections of the software applications using pinned windows and create appealing user interfaces, for example:

```
{
    "id": "config-PinnedPanel-1630584428627-Button-
1630584441598",
    "icon": "mdi mdi-cursor-pointer",
    "type": "element",
    "group": [
       "form",
       "card"
    ],
;
```

8) supports multiple screen pages to be defined as declarative with or without conditions, for example:

```
"onDelete": {
   "action": {
      "label": "Open Modal",
      "value": "openModal"
   },
   "provider": {
      "label": " config-ModalForm-
1630583710244",
      "value": "config-ModalForm-
1630583710244"
   }
;
```

9) support different providers, applications to connect to each interconnecting functional unit 140 as one software application; 10) supports for mapping to input schema such as, but not limited to, csv, Excel, SQL table, Google Sheets, JavaScript NoSQL databases, and more; and 11) support custom styles, as illustrated by FIG. 15, each software application supports theme with each element supported with its own CSS style, including at least one or more of, but no limited to: font size, text color, icon color, input background color, check box color, selection color, agreements color, background color, navigation color, input border color, signature color, toggle thumb color, toggle track color, navigation background color, selection active color, signature border color, toggle track color active, and more.

Figure 16:
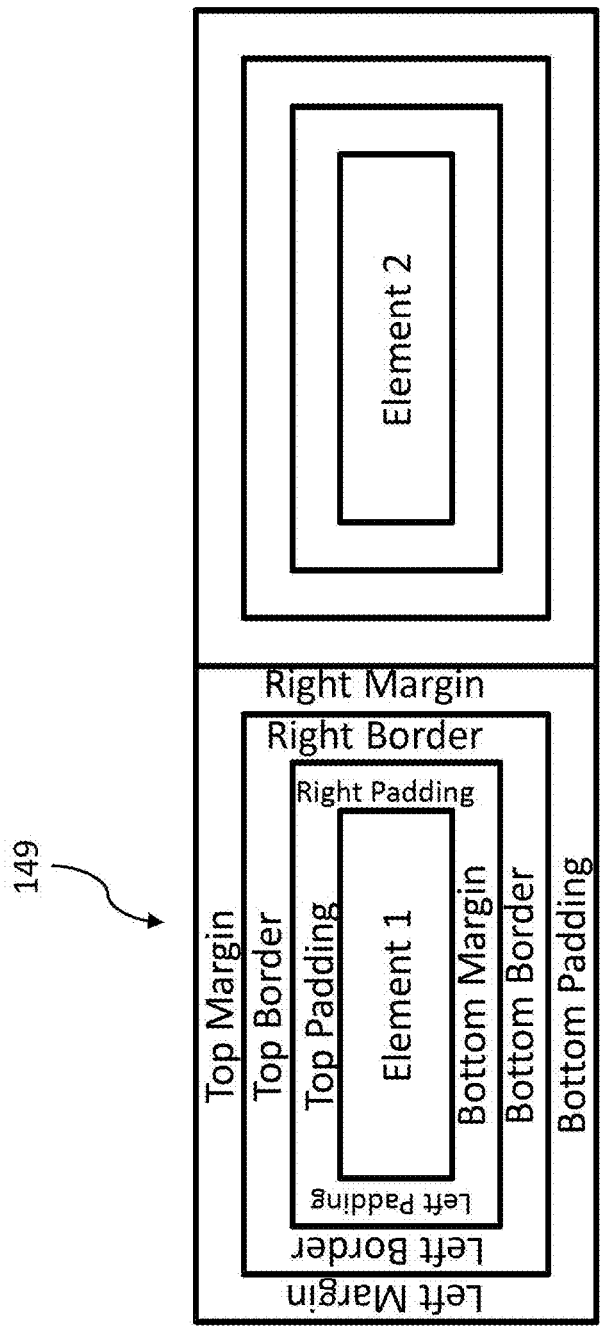
FIG. 16 illustrates a representative canvas drawing designed to create forms.
Figure 17C:
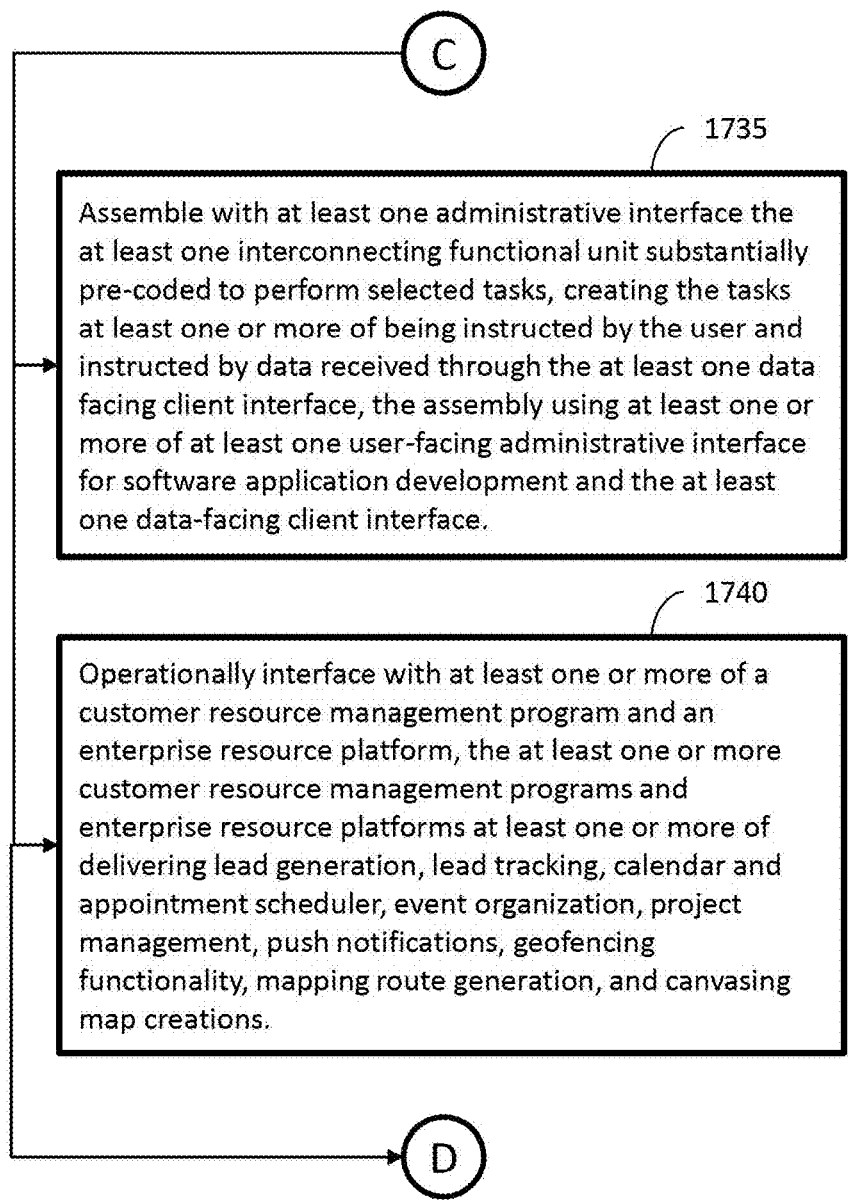
Figure 17D:
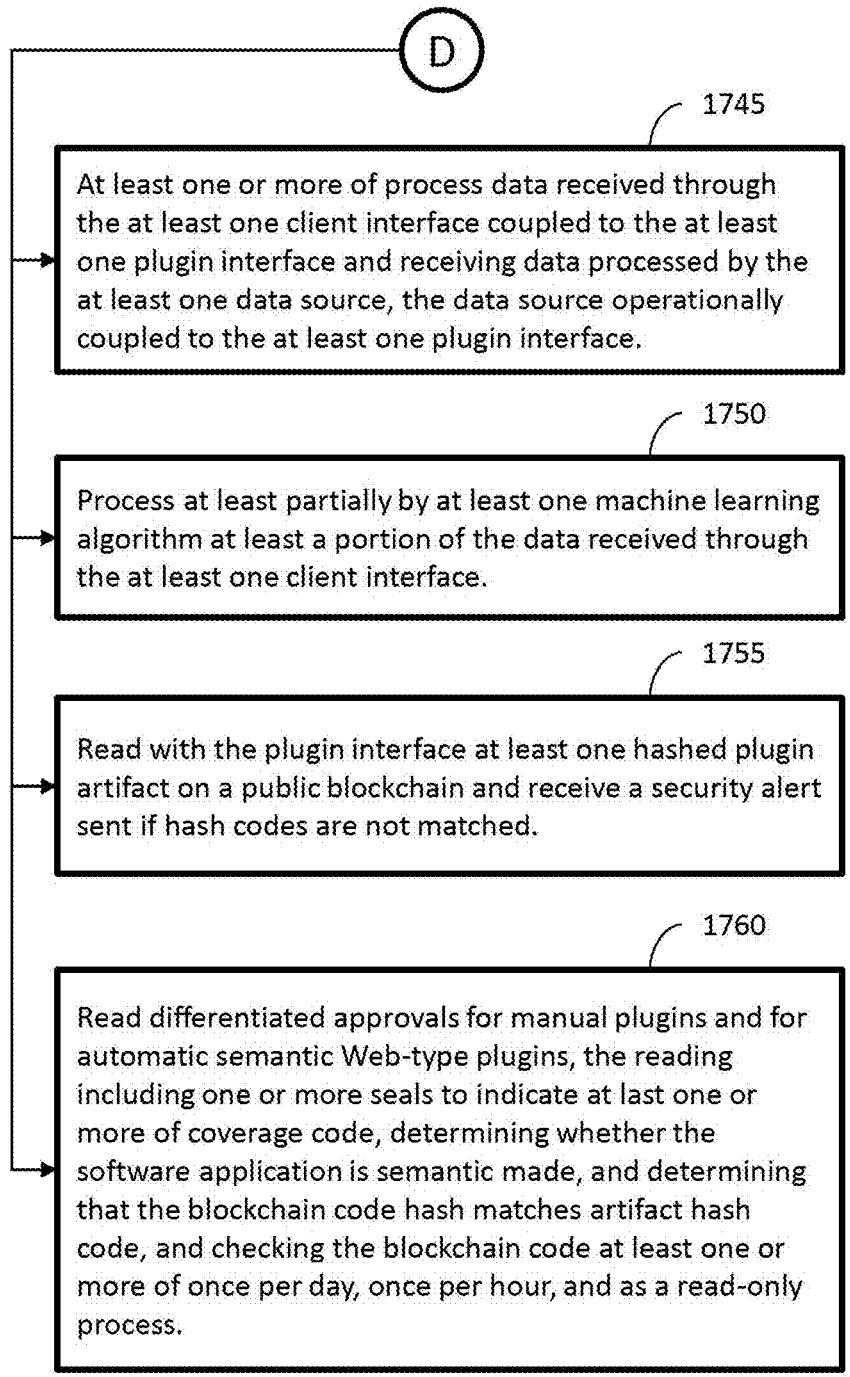

As illustrated in FIGS. 15-16, declarative language 146 ACENji 147 may include canvas drawing 149 designed to create such documents as pdf forms and populate those pdf forms with dynamically driven data, and may be further designed for drawing, prepare, and rendering full HTML Web sites.

Illustrated in FIGS. 17A-17D is a representative method for using a no-code software development platform 10, the method including the step of 1700, operating through a user interface 118 the no-code software development platform 10 stored within at least one memory storage medium 115 disposed on at least one computer processor 100. The method further includes the step of 1705, accessing through at least one interconnecting functional unit 140 at least one or more of at least one pre-coded form application 142 and at least one pre-coded card application 144. The method further includes the step of 1710, performing independent, conditions-based functions on the at least one pre-coded form application 142. The method further includes the step of 1715, performing interconnected workflow functions by way of the at least one pre-coded card application 144, the at least one pre-coded card application 144 further providing the capability to integrate with the at least one pre-coded form application 142. The method further includes the step of 1720, operationally coupling with at least one plugin interface 150 at least one client data source 135 via the at least one data facing client interface 130. The method further includes the step of 1725, operably coupling with a declarative language software program 146 the at least one interconnecting functional unit 140, the declarative language software program 146 further managing the combined function of the at least one interconnecting functional unit 140.

The method for using a no-code software development platform 10 may further include the step of 1730, at least one or more of using an existing template, creating a template, and forgoing templates, wherein created templates may further be made available to at least one or more of individuals, groups, and members within an authorization hierarchy, the groups further determined by at least one or more of individual identity, group identity, assignment identity, and geolocation features.

The method for using a no-code software development platform 10 may further include the step of 1735, assembling with at least one administrative interface the at least one interconnecting functional unit 140 substantially pre-coded to perform selected tasks, creating the tasks at least one or more of being instructed by the user and instructed by data received through the at least one data facing client interface 130, the assembly using at least one or more of at least one user-facing administrative interface 120 for software application development and the at least one data-facing client interface 130.

The method for using a no-code software development platform 10 may further include the step of 1740, operationally interfacing with at least one or more of a customer resource management program and an enterprise resource platform, the at least one or more customer resource management programs and enterprise resource platforms at least one or more of delivering lead generation, lead tracking, calendar and appointment scheduler, event organization, project management, push notifications, geofencing functionality, mapping route generation, and canvasing map creations.

The method for using a no-code software development platform 10 may further include the step of 1745, at least one or more of processing data received through the at least one client interface 130 coupled to the at least one plugin interface 150 and receiving data processed by the at least one data source, the data source operationally coupled to the at least one plugin interface 150.

The method for using a no-code software development platform 10 may further include the step of 1750, processing at least partially by at least one machine learning algorithm at least a portion of the data received through the at least one client interface 130.

The method for using a no-code software development platform 10 may further include the step of 1755, reading with the plugin interface at least one hashed plugin artifact on a public blockchain, and receiving a security alert sent if hash codes are not matched.

The method for using a no-code software development platform 10 may further include the step of 1760, reading differentiated approvals for manual plugins and for automatic semantic Web-type plugins, the reading including one or more seals to indicate at last one or more of coverage code, determining whether the software application is semantic made, and determining that the blockchain code hash matches artifact hash code, and checking the blockchain code at least one or more of once per day, once per hour, and as a read-only process.

The following patents are incorporated by reference in their entireties: U.S. Pat. Nos. 10,802,845, US2016139888, US2020234003, U.S. Pat. No. 9,880,712, US2017131978, US2015339277, US2014201705, US2011202384, US2018213048, U.S. Pat. Nos. 8,407,576, 10,387,125, 8,930,833, WO12148867, JP2002215393.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A no-code software development platform comprising:
   at least one computer processor and user interface operable with a memory storage medium;
   at least one interconnecting functional unit including at least one or more of at least one pre-coded form application and at least one pre-coded card application;
   the at least one pre-coded form application adapted to perform independent, conditions- based functions;
   the at least one pre-coded card application adapted to perform interconnected workflow functions and to provide a capability to integrate with the at least one pre-coded form application;
   at least one plugin interface adapted to operationally couple with at least one client data source via at least one data facing client interface; and
   a declarative language software program operably coupling to the at least one interconnecting functional unit, the declarative language software program further managing a combined function of the at least one interconnecting functional unit.

2. The no-code software development platform of claim 1 wherein users may at least one or more of use a template, create a template, and forgo templates, wherein created templates may further be made available to at least one or more of individuals, groups, and members within an authorization hierarchy, the groups further determined by at least one or more of individual identity, group identity, assignment identity, and geolocation features.

3. The no-code software development platform of claim 1 further comprising at least one or more of at least one user-facing administrative interface for software application development and at least one data-facing client interface, the at least one administrative interface adapted for assembling at least one interconnecting functional unit pre-coded to perform selected tasks, the tasks created at least one or more of instructed by the user and instructed by data received through the at least one data facing client interface.

4. The no-code software development platform of claim 1 wherein computer processor and storage medium operationally interfaces with at least one or more of a customer resource management programs and an enterprise resource platforms, the at least one or more customer resource management programs and enterprise resource platforms at least one or more of delivering lead generation, lead tracking, calendar and appointment scheduler, event organization, project management, push notifications, geofencing functionality, mapping route generation, and canvasing map creations.

5. The no-code software development platform of claim 1 wherein the declarative language software application at least one or more of processes data received through at least one client interface coupled to the at least one plugin interface and receives data processed by the at least one data source operationally coupled to the at least one plugin interface.

6. The no-code software development platform of claim 1 wherein at least a portion of the data received through at least one client interface is at least partially processed by at least one machine learning algorithm.

7. The no-code software development platform of claim 1 wherein the declarative language is based on JavaScript Object Notation format.

8. A method for using a no-code software development platform comprising:
   operating the no-code software development platform stored within at least one memory storage medium disposed on at least one computer processor;
   accessing through at least one interconnecting functional unit at least one or more of at least one pre-coded form application and at least one pre-coded card application;
   performing independent, conditions-based functions on the at least one pre-coded form application;
   performing interconnected workflow functions by way of the at least one pre-coded card application, the at least one pre-coded card application further providing a capability to integrate with the at least one pre-coded form application;

operationally coupling with at least one plugin interface at least one client data source via a at least one data facing client interface; and operably coupling with a declarative language software program the at least one interconnecting functional unit, the declarative language software program further managing a combined function of the at least one interconnecting functional unit.

9. The method for using a no-code software development platform of claim 8, the method further including steps of at least one or more of using an existing template, creating a template, and forgoing templates, wherein created templates may further be made available to at least one or more of individuals, groups, and members within an authorization hierarchy, the groups further determined by at least one or more of individual identity, group identity, assignment identity, and geolocation features.

10. The method for using a no-code software development platform of claim 8, the method further including assembling with at least one administrative interface the at least one interconnecting functional unit pre-coded to perform selected tasks, creating the tasks at least one or more of being instructed by a user and instructed by data received through the at least one data facing client interface, an assembly using at least one or more of at least one user-facing administrative interface for software application development and at least one data-facing client interface.

11. The method for using a no-code software development platform of claim 8, the method further including operationally interfacing with at least one or more of a customer resource management programs and an enterprise resource platforms, at least one or more customer resource management programs and enterprise resource platforms including at least one or more of delivering lead generation, lead tracking, calendar and appointment scheduler, event organization, project management, push notifications, geofencing functionality, mapping route generation, and canvasing map creations.

12. The method for using a no-code software development platform of claim 8, the method further including at least one or more of processing data received through at least one client interface coupled to the at least one plugin interface and receiving data processed by the at least one data source, the data source operationally coupled to the at least one plugin interface.

13. The method for using a no-code software development platform of claim 8, the method further including processing at least partially by at least one machine learning algorithm at least a portion of data received through the at least one client interface.

14. The method for using a no-code software development platform of claim 8, the method further including reading with the plugin interface at least one hashed plugin artifact on a public blockchain and receiving a security alert sent if hash codes are not matched.

15. The method for using a no-code software development platform of claim 8, the method further including reading differentiated approvals for manual plugins and for automatic semantic Web-type plugins, the reading including one or more seals to indicate at least one or more of coverage code, determining whether the software application is semantic made, and determining that the blockchain code hash matches artifact hash code, and checking the blockchain code at least one or more of once per day, once per hour, and as a read-only process.

16. A no-code software development platform comprising:

at least one computer processor and user interface operable with a memory storage medium;

at least one interconnecting functional unit comprising at least one or more of at least one pre-coded form application and at least one pre-coded card application;

the at least one pre-coded form application adapted to perform independent, conditions- based functions;

the at least one pre-coded card application adapted to perform interconnected workflow functions and to provide a capability to integrate with the at least one pre-coded form application;

at least one plugin interface, the at least one plugin interface adapted to operationally couple with at least one client data source via a at least one data facing client interface, the plugin interface further reading at least one hashed plugin artifact on a public blockchain, a security alert sent if hash codes are not matched; and a declarative language software program operably coupling the at least one interconnecting functional unit, the declarative language software program further managing a combined function of the at least one interconnecting functional unit.

17. The no-code software development platform of claim 16 wherein users may at least one or more of use a template, create a template, and forgo templates, wherein created templates may further be made available to at least one or more of individuals, groups, and members within an authorization hierarchy, the groups further determined by at least one or more of individual identity, group identity, assignment identity, and geolocation features.

18. The no-code software development platform of claim 16, wherein differentiated approval are read for manual plugins and for automatic semantic Web-type plugins, reading adapted to include one or more seals to indicate at least one or more of coverage code, whether the software application is semantic made, and that a blockchain code hash matches artifact hash code, the blockchain code hash which is checked at least one or more of once per day, once per hour, and as a read-only process.

19. The no-code software development platform of claim 16 wherein at least a portion of the data received through at least one client interface is at least partially processed by at least one machine learning algorithm.

20. The no-code software development platform of claim 16 wherein the declarative language is based on JavaScript Object Notation format.

* * * * *